United States Patent
Jariwala et al.

(10) Patent No.: US 12,522,725 B2
(45) Date of Patent: Jan. 13, 2026

(54) SYNERGISTS FOR HYPERBRANCHED POLYOL POLYMER PROCESSING ADDITIVES

(71) Applicant: 3M INNOVATIVE PROPERTIES COMPANY, St. Paul, MN (US)

(72) Inventors: Chetan P. Jariwala, Woodbury, MN (US); Claude Lavallee, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/709,634

(22) PCT Filed: Nov. 2, 2022

(86) PCT No.: PCT/IB2022/060567
§ 371 (c)(1),
(2) Date: May 13, 2024

(87) PCT Pub. No.: WO2023/089434
PCT Pub. Date: May 25, 2023

(65) Prior Publication Data
US 2025/0002710 A1    Jan. 2, 2025

Related U.S. Application Data

(60) Provisional application No. 63/282,081, filed on Nov. 22, 2021.

(51) Int. Cl.
*C08L 67/04* (2006.01)
*C08J 5/18* (2006.01)
*C08L 23/06* (2006.01)
*C08L 71/02* (2006.01)

(52) U.S. Cl.
CPC ............ *C08L 67/04* (2013.01); *C08J 5/18* (2013.01); *C08L 23/06* (2013.01); *C08L 71/02* (2013.01); *C08J 2323/06* (2013.01); *C08J 2467/04* (2013.01); *C08J 2471/02* (2013.01); *C08L 2203/16* (2013.01); *C08L 2203/30* (2013.01); *C08L 2205/025* (2013.01); *C08L 2205/03* (2013.01); *C08L 2207/066* (2013.01); *C08L 2310/00* (2013.01)

(58) Field of Classification Search
CPC ............ C08L 67/04; C08L 2203/16; C08L 2203/30; C08L 2205/025; C08L 2205/03; C08L 2207/066; C08L 23/06; C08L 2310/00; C08L 71/02; C08J 2323/06; C08J 2323/08; C08J 2467/04; C08J 2471/02; C08J 3/226; C08J 5/18

See application file for complete search history.

(56) References Cited

U.S. PATENT DOCUMENTS

| | | | |
|---|---|---|---|
| 4,855,360 | A | 8/1989 | Duchesne et al. |
| 5,663,247 | A | 9/1997 | Sorensen et al. |
| 6,300,424 | B1 | 10/2001 | Frechet et al. |
| 6,818,695 | B2 | 11/2004 | Dillon et al. |
| 2018/0244901 | A1 | 8/2018 | Kenny et al. |

FOREIGN PATENT DOCUMENTS

| | | | |
|---|---|---|---|
| CN | 113881122 A | * | 1/2022 |
| EP | 1506259 B1 | | 9/2006 |
| EP | 2070972 A1 | | 6/2009 |
| JP | 2004502847 A | * | 1/2004 |
| JP | 2012031394 A | * | 2/2012 |
| WO | 1996012754 A1 | | 5/1996 |

OTHER PUBLICATIONS

JP-2012031394-A machine translation (Feb. 16, 2013).*
JP-2004502847-A machine translation (Jan. 29, 2004).*
CN-113881122-A machine translation (Jan. 4, 2022).*
Hong, "A Novel Processing Aid for Polymer Extrusion: Rheology and Processing of Polyethylene and Hyperbranched Polymer Blends", 1999, Journal of Rheology, vol. 43, pp. 781-793.
Hong, "Film Blowing of Linear Low-Density Polyethylene Blended with a Novel Hyperbranched Polymer Processing Aid", 2000, Polymer, vol. 41, pp. 7705-7713.
International Search Report for PCT Application No. PCT/IB2022/060567, mailed on Feb. 13, 2023, 4 pages.

* cited by examiner

Primary Examiner — Ana L. Woodward
(74) Attorney, Agent, or Firm — Jeffrey M. Olofson (57) ABSTRACT

Synergists are combined with hyperbranched polyester polyols to form polymer processing additive compositions. The synergists are selected from the group consisting of polyethylene glycols, polyethylene oxides, polycaprolactones and combinations thereof. Compositions containing a thermoplastic polymer and such polymer processing additive compositions, as well as methods of extruding thermoplastic polymers containing such polymer processing additive compositions are also described.

19 Claims, 5 Drawing Sheets

SYNERGISTS FOR HYPERBRANCHED POLYOL POLYMER PROCESSING ADDITIVES

CROSS REFERENCE TO RELATED APPLICATIONS

This application is a national stage filing under 35 U.S.C. 371 of PCT IB2022/060567, filed 2 Nov. 2022, which claims the benefit of U.S. Application No. 63/282,081, filed 22 Nov. 2021, the disclosure of which is incorporated by reference in its/their entirety herein.

FIELD

The present disclosure relates to synergists for use with hyperbranched polyol polymer processing additives and thermoplastic polymer compositions containing them.

SUMMARY

Briefly, in one aspect, the present disclosure provides compositions comprising a major amount of a thermoplastic polymer and an additive composition comprising a hyperbranched polyester polyol and a synergist selected from the group consisting of polyethylene glycols, polyethylene oxides, polycaprolactones and combinations thereof.

In another aspect, the present disclosure provides methods for forming a film comprising blending a thermoplastic polymer with a hyperbranched polyester polyol and a synergist selected from the group consisting of polyethylene glycols, polyethylene oxides, polycaprolactones and combinations thereof to form a composition, and extruding the composition.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Extrusion of polymeric materials in the formation and shaping of articles is a major segment of the plastic or polymeric articles industry. The quality of the extruded article and the overall success of the extrusion process are influenced by the interaction of the fluid material with the extrusion die. The desire for a smooth extrudate surface competes with, and must be optimized with respect to, the economic advantages of extruding a polymer composition at the fastest possible speed (for example at high shear rates).

For any melt-processable thermoplastic polymer composition, there exists a critical shear rate above which the surface of the extrudate becomes rough or distorted and below which the extrudate will be smooth. At shear rates slightly above the critical shear rate, defects in extruded thermoplastics may take the form of "sharkskin" which is a loss of surface gloss that, in more serious manifestations, appears as ridges running more or less transverse to the extrusion direction. At higher shear rates, the extrudate can undergo "continuous melt fracture" becoming grossly distorted. At rates lower than those at which continuous melt fracture is first observed, certain thermoplastics can also suffer from "cyclic melt fracture" in which the extrudate surface varies from smooth to rough.

Other problems encountered during extrusion of thermoplastic polymers include build-up of the polymer at the orifice of the die (known as die build up or die drool), high back pressure during extrusion runs, and excessive degradation or low melt strength of the polymer due to the need to use higher extrusion temperatures to overcome these issues. These problems slow the extrusion process either because the process must be stopped to clean the equipment or because the process must be run at a lower speed.

Additives for polymer processing (also referred to as "polymer processing additives" or "PPA") have been used to address such problems. PPAs can reduce melt stagnation at the die and increase the shear rates at which thermoplastic polymers may be extruded without visible melt defects.

Fluoropolymers are commonly used as polymer processing additives. In some instances, the performance of fluorinated PPAs can be enhanced by incorporating a "synergist." For example, U.S. Pat. No. 6,818,695 B2 ("Extrudable Thermoplastic Compositions," Dillon et al.) describes the use of hyperbranched polyesters and hyperbranched polyesteramides as synergists for use with various fluorinated polymer processing additives. Although synergists are effective at reducing the amount of fluorinated material required, there is a desire to eliminate the use of fluorinated PPAs in some applications.

Hong et al. describe the use of functionalized hyperbranched polyesters as polymer processing additives. (*J. Rheol.* 43(3) May/June 1999, pp. 781-93.) The hydroxy groups of the hyperbranched polyesters are either reacted with C-14 alkanes to form hexadecanote-terminated polymers or the hydroxy groups are reacted with a mixture of eicosanoic and docosanoic acid such that 50 to 90% of the groups are terminated with C-20/22 alkanes. Hong and Coombs, et al. also describe the use of hyperbranched polyesters functionalized with eicosanoic and docosanoic acids as polymer processing additives. (*Polymer*, 41 (2000), pp. 7705-13.)

The present inventors discovered that, when combined with synergists, the hydroxy groups of hyperbranched polyesters do not need to be functionalized to provide the benefits of a polymer processing additive, e.g., a reduction in melt defects.

Hyperbranched polymers are known in the art. Hyperbranched polymers are similar to dendrimers in that both are characterized by a highly branched 3-dimensional structure. All bonds emanate from a core, with a branch juncture are each monomer unit and a multiplicity of reactive chain ends. A branching generation is composed of structural units which are bound radially to the core or to the structural units of a previous generation and which extend outwards. The structural units have at least two monofunctional groups and/or at least one monofunctional group and one multifunctional group. The term multifunctional is understood as having a functionality of 2 or higher. To each functionality, a new structural unit may be linked, a higher branching generation being produced as a result. Unlike dendrimers, hyperbranched polymers have an irregular structure and positioning of their functional groups; thus, while dendrimers are described as having precise "generations," hyperbranched polymers are described as having "pseudo-generations." The resulting hyperbranched polymers have a core, at least one branching pseudo-generation and an external surface composed of functional end groups.

Hyperbranched polymers of the polyester type are described in, e.g., International Publication Number WO 96/12754 and U.S. Pat. No. 6,300,424 B1.

As used herein, a "hyperbranched polyester polyol" refers to a hydroxy-functional, hyperbranched polyester in which at least 90 mole % of the functional end groups are hydroxy groups, e.g., in some embodiments, at least 95 or even 100 mole % of the functional end groups are hydroxy groups. The term "hyperbranched polyester polyol" distinguishes the hydroxy-functional, hyperbranched polyesters of the present disclosure from functionalized hyperbranched polyesters in which a higher percentage (e.g., 50%, 90% or even 100%) of the hydroxy groups are replaced with, e.g., fatty acid or amine functional groups. Suitable hyperbranched polyester polyols are available from Perstorp AB under the trade name BOLTRON, e.g., BOLTON H20 (reported to be a pseudo generation 2 with 16 hydroxyl functional groups), H30 (reported to be a pseudo generation 3 with 32 hydroxyl functional groups), and H40 (reported to be a pseudo generation 4 with 64 hydroxyl functional groups). These hyperbranched polyester polyols are described as having 2,2-bis (methylol)propionic acid ("bis-MPA") branching units.

As shown in the Examples, when combined with a thermoplastic polymer, the hyperbranched polyester polyols of the present disclosure function as polymer processing additives. That is, hyperbranched polyester polyols reduce the time to clear melt fracture. In some embodiments, the hyperbranched polyester polyols also reduce the pressure drop of extrusion.

The present inventors discovered that the performance of the hyperbranched polyester polyols as polymer processing additives could be improved by the addition of a synergist to form a polymer processing additive composition. In some embodiments, the synergists further reduce the time to melt fracture. In some embodiments, the synergists further reduce the pressure drop of extrusion. In some embodiments, the synergists can be used to reduce the amount of the hyperbranched polyester polyol polymer processing additive while maintaining the same or similar performance.

Suitable synergists include polyethylene glycol, poly(ethylene oxide) and polycaprolactone. In some embodiments, the polyethylene glycols have a number average molecular weight of 1000 to 50,000 Daltons, e.g., 4000 to 25,000 Daltons. In some embodiments, the poly(ethylene oxide)s have a number average molecular weight of 10,000 to 500,000 Daltons, e.g., 15,000 to 400,000 Daltons. In some embodiments, the polycaprolactones have a number average molecular weight of 2,000 to 200,000 Daltons, e.g., 50,000 to 150,000 Daltons. The number average molecular weight may be measured by Gel Permeation Chromatography (GPC) using polyethylene glycol and poly(ethylene oxide) standards. GPC equipment and standards are available from Agilent Technologies, Inc.

Generally, the weight ratio of the hyperbranched polyester polyol to the synergist in the polymer processing additive composition is from 90:10 to 10:90. In some embodiments, the weight ratio is 75:25 to 25:75, or even 60:40 to 40:60.

In some embodiments, the thermoplastic polymers to which the hyperbranched polyester polyols and synergists are added comprise polymers obtained by the homopolymerization or copolymerization of olefins. Suitable olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene, and butene-1. Representative examples of olefinic polymers include polyethylene, polypropylene, polybutene-1, poly(3-methylbutene), poly(4-methylpentene) and copolymers of ethylene with propylene, butene-1, hexane-1, octene-1, decene-1,4-methyl-1-pentene and octadecene-1.

In some embodiments, the thermoplastic polymers are copolymers of one or more olefins and up to about 30 weight percent, but preferably 20 weight percent or less, of one or more monomers which are copolymerizable with such olefins. Representative monomers which are copolymerizable with olefins are vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile, vinyl aryl monomers such as styrene, o-methoxystyrene, p-methoxy styrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers, N-vinyl carbazole monomers, and N-vinyl pyrrolidone monomers.

In some embodiments, the thermoplastic polymers also include the metallic salts of olefin copolymers, or blends thereof, which contain free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt.

Representative blends of thermoplastic hydrocarbon polymers useful in this invention are blends of polyethylene and polypropylene, low-density polyethylene and high-density polyethylene, and polyethylene and olefin copolymers containing copolymerizable monomers, some of which are described above, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The thermoplastic polymers may be used in the form of powders, pellets, granules, or any other extrudable form. In some embodiments, the thermoplastic polymer may contain other additives such as, e.g., anti-blocking agents, anti-slip agents, light stabilizers, and fillers.

Generally, the amount of the polymer processing additive composition (i.e., the combined amount of the hyperbranched polyester polyol polymer processing additive and the synergist) contained in the thermoplastic composition is not particularly limited. However, for composition intended for extrusion into finished articles and int finished article, it may be desirable to minimize the amount of the polymer processing additive composition, while maintaining the desired processing performance. In some embodiments, such compositions ad articles comprise no greater than 5000 ppm of the polymer processing additive composition based on the total weight of the composition. For example, in some embodiments, such compositions or articles comprise 100 to 3000, e.g., 500 to 1500 ppm of the polymer processing additive composition based on the total weight of the composition.

In some embodiments, each component of the polymer processing additive composition may be added separately to the thermoplastic polymer. In some embodiments, the hyperbranched polyester polyol polymer processing additive and the synergist may be blended, e.g., in the desired ratio, and then added together to the thermoplastic polymer. For example, the components of the polymer processing additive composition may be blended by physical mixing or melt-blending. In such embodiments, additional amounts of the hyperbranched polyester polyol polymer processing additive or the synergist may be added to the thermoplastic polymer to adjust their amounts.

As it may be difficult to control the amount of the polymer processing additive composition at such low levels, in some embodiments, master batches may be used. Such a master batch contains a higher proportion of one or more of the components of the polymer processing additive composition in a host resin. The host resin is elected to be compatible with the thermoplastic polymer and may be the same or different than the thermoplastic polymer.

In some embodiments, separate master batches may be used with one containing the hyperbranched polyester polyol polymer processing additive and one containing the synergist. This may be useful when, e.g., it may be desirable to adjust the ratio of the hyperbranched polyester polyol polymer processing additive and the synergist. Again, the amount of the specific component in the master batch is not critical. In some embodiments, the master batches contain 0.2 to 10 wt. %, e.g., 0.5 to 5 wt. % of those components of the polymer processing additive composition present in the master batch. In some embodiments, a single combined masterbatch containing both the hyperbranched polyester polyol polymer processing additive and the synergist.

Known equipment and methods may be used both to compound the polymer processing additive composition into the thermoplastic polymer and to process the compounded composition. For example, the polymer processing additive compositions of the present disclosure are useful in the processing of thermoplastic polymers, which includes for example, extrusion of films, extrusion blow molding, injection molding, pipe, wire or cable extrusion, and fiber production.

Examples. The materials used to prepare the polymer processing additive compositions used in the following examples are summarized in Table 1.

TABLE 1

Summary of materials used in the preparation of the examples.

| Name | Description | Trade Name and Source |
| --- | --- | --- |
| PPA | Hyperbranched polyester polyol | BOLTRON H20; Perstorp Polyol Inc. |

TABLE 1-continued

Summary of materials used in the preparation of the examples.

| Name | Description | Trade Name and Source |
| --- | --- | --- |
| PCL 4K | Polycaprolactone (4000 MW) | obtained from Ingevity |
| PCL 80K | Polycaprolactone (80,000 MW) | obtained from Spectrum Chemical |
| PEO 20K | Poly(ethylene oxide) (20,000 MW) | obtained from Alfa Aesar |
| PEO 100K | Poly(ethylene oxide) (100,000 MW) | obtained from Acros Organics |
| PEO 300K | Poly(ethylene oxide) (300,000 MW) | obtained from Acros Organics |
| PEG 8K | Polyethylene glycol (8000 MW) | obtained from Dow Chemical Co. |

Individual master batches of the hyperbranched polyester polyol polymer processing additive (PPA) and each synergist were prepared. Each master batch was prepared by combining 60 grams (g) of the desired material (i.e., PPA or synergist) with 2935 g of the 2MI LLDPE (EM 1002.09 available from Exxon Mobil), 3.0 g of IRGANOX B900 heat stabilizer (from BASF), and 2.1 g of zinc stearate in a bag and shaking vigorously. The resulting mixture was fed to a laboratory scale, intermeshing, counter rotating, unvented, air cooled, conical twin screw (HaakeBuchler Rheomix TW-100) with a front inside diameter of 33 mm. The mixture was gravity fed to the throat of the extruder, exposed to air at a rate of 55 g/min. The extruder specific temperature profile of the 3 barrel zones (feed, metering, mixing), and die zone was 170/190/200/200° C., respectively. The extruder was run at 150 RPM for the first "compounding" pass. The 2nd pass was run with the same temperature profile but at 90 RPM while flood feeding the material. A 4 minute "purge" of material was discarded at the beginning each pass. Each master batch contained 2.0 wt. % of the desired component (i.e., the PPA or a synergist) based on the total weight of the master batch.

Extrudable compositions were prepared by blending the desired master batches in a 0.9 MI ZN LLDPE (MARFLEX 7109 available from Chevron Phillips Chemicals). Reference samples contained only the hyperbranched polyester polyol polymer processing additive. Comparative Examples contained only a synergist. Examples contained both the hyperbranched polyester polyol PPA and a synergist. All of the extrudable compositions also contained 6000 ppm of an anti-block additive (ABT 2500, AMPACET MB #101558) and 1000 ppm of a slip agent (ERUCAMIDE, Ampacet MB #10090).

Melt fracture and pressure drop were evaluated using a Kiefel blown film line with a 40 mm, 24/1, grooved feed extruder. The die was of spiral design with a 40 mm diameter, 14 L/D, and 0.9 mm die gap. Extrusion was performed at 210° C., 10.5 kg/hour, and 220/s.

The pressure was recorded every 10 minutes and a sample of film was collected. The film was examined for the presence of melt fracture (MF) and expressed as a percentage of the film area covered with MF. The time corresponding to the disappearance of the last band of MF or time to clear melt fracture was recorded (TTC), at which point the test was stopped. If any MF was remaining at the end of two hours, the test was stopped, and the final MF level recorded. In that case the TTC was estimated from the shape of the curve.

Figure 1:
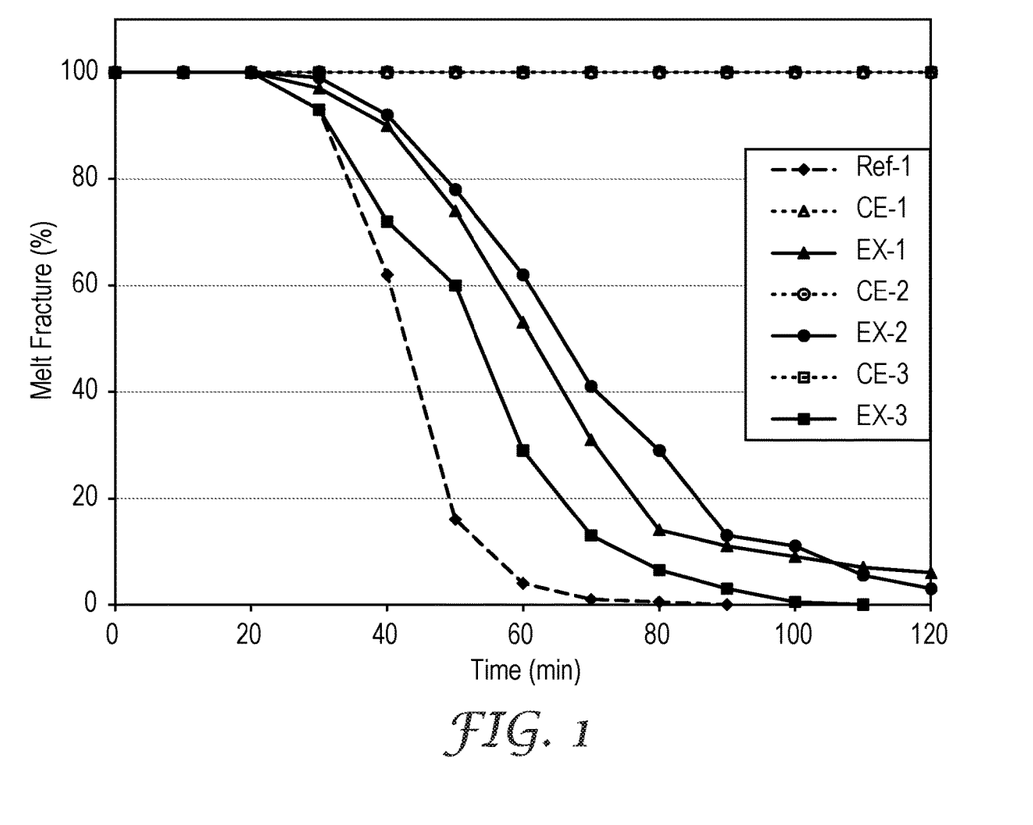
FIG. 1 shows the effects of various synergists on the melt fracture reduction obtained with a hyperbranched polyester polyol polymer processing additive.

The effects of various classes of synergists were evaluated by comparing a sample containing 1000 ppm of the hyperbranched polyester polyol PPA (REF-1) to samples containing 500 ppm of the hyperbranched polyester polyol PPA and 500 ppm of a synergist (Examples EX-1 to EX-3) where all amounts are reported as ppm by weight based on the total weight of the extruded composition. For each synergist, a comparative example was run containing only 1000 ppm of the synergist (CE-1 to CE-3). The melt fracture results are summarized in Table 2 and shown in FIG. 1. The pressure drop results are also reported in Table 2.

TABLE 2

Performance of various synergists in combination with a hyperbranched polyol PPA.

| ID | PPA (ppm) | Synergist | Synergist (ppm) | TTC (minutes) | MF@120 minutes | Pressure Reduction |
|---|---|---|---|---|---|---|
| Ref-1 | 1000 | None | 0 | 90 | 0% | 5.1% |
| CE-1 | 0 | PCL 4K | 1000 | 120 | 100% | 3.2% |
| EX-1 | 500 | PCL 4K | 500 | 120 | 6% | 6.8% |
| CE-2 | 0 | PEO 100K | 1000 | 120 | 100% | 5.4% |
| EX-2 | 500 | PEO 100K | 500 | 120 | 3% | 7.5% |
| CE-3 | 0 | PEG 8K | 1000 | 120 | 100% | 8.9% |
| EX-3 | 500 | PEG 8K | 500 | 110 | 0% | 7.2% |

As shown, none of the synergists alone were effective at reducing melt fracture (CE-1 to CE-3). However, each synergist, when combined with the hyperbranched polyester polyol PPA, provided good results while reducing the required amount of the hyperbranched polyester polyol PPA by 50% (500 ppm of the hyperbranched polyester polyol PPA in EX-1 to EX-3 as compared to 1000 ppm of the hyperbranched polyol PPA in REF-1).

Figure 2:
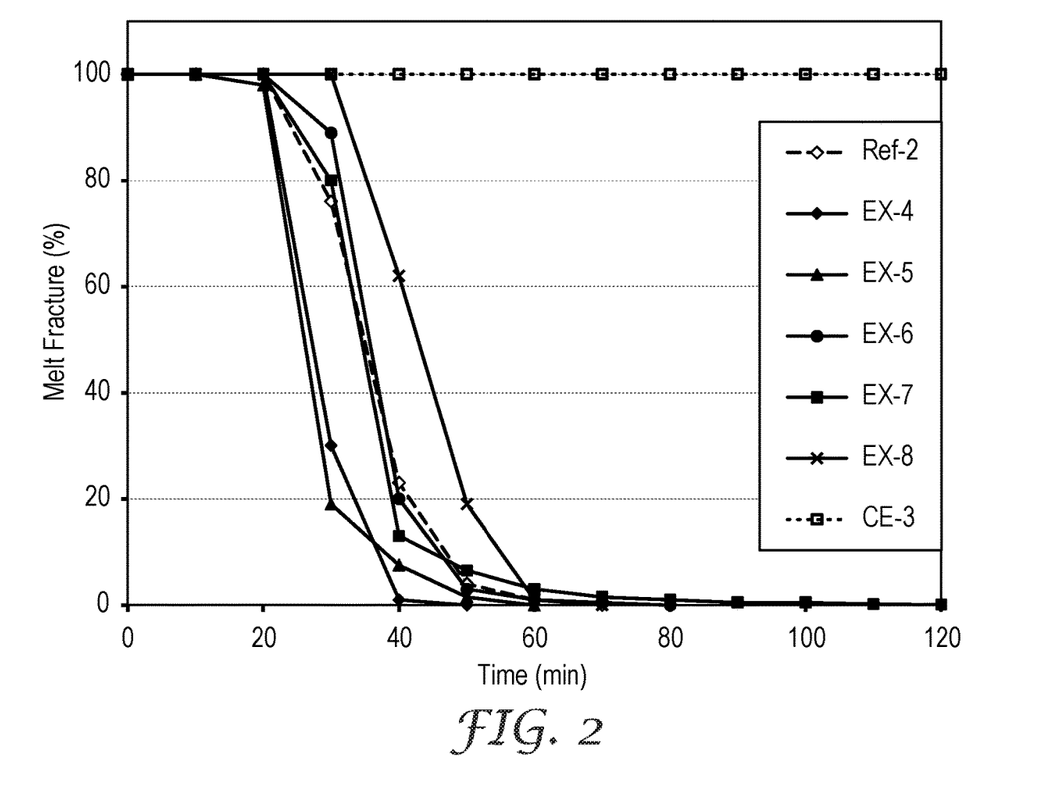
FIG. 2 shows the effects of adding various amounts of a polyethylene glycol synergist on the melt fracture reduction obtained with a hyperbranched polyester polyol polymer processing additive.

Additional samples were prepared by varying the relative amounts of the hyperbranched polyester polyol PPA with the PEG 8K synergist. The melt fracture results are summarized in Table 3 and shown in FIG. 2. The pressure drop results are also reported in Table 3.

TABLE 3

PEG synergist with a hyperbranched polyester polyol PPA.

| ID | PPA (ppm) | Synergist | Synergist (ppm) | TTC (minutes) | MF@120 minutes | Pressure Reduction |
|---|---|---|---|---|---|---|
| Ref-2 | 1000 | None | 0 | 70 | 0% | 7.5% |
| EX-4 | 900 | PEG 8K | 100 | 50 | 0% | 6.9% |
| EX-5 | 750 | PEG 8K | 250 | 60 | 0% | 7.1% |
| EX-6 | 500 | PEG 8K | 500 | 80 | 0% | 7.0% |
| EX-7 | 250 | PEG 8K | 750 | 120 | 0% | 8.9% |
| EX-8 | 100 | PEG 8K | 900 | 70 | 0% | 7.6% |
| CE-3 | 0 | PEG 8K | 1000 | 120 | 100% | 8.9% |

Figure 3:
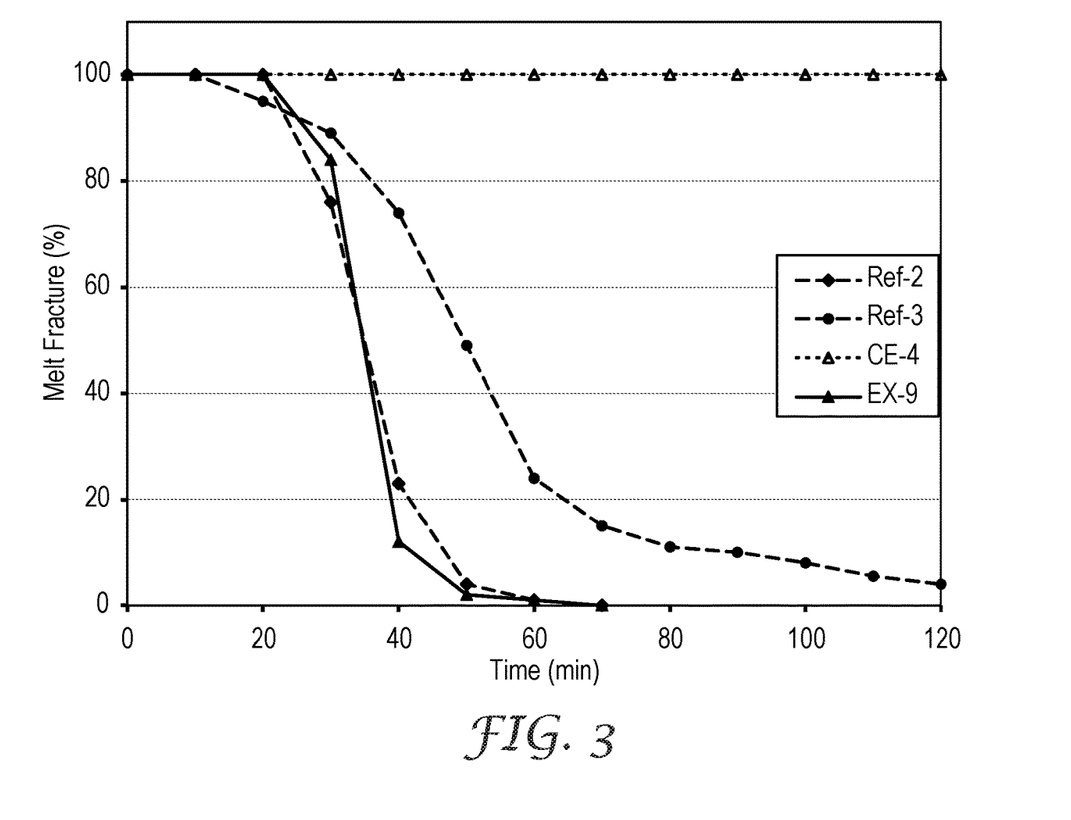
FIG. 3 shows the effects of adding a polycaprolactone synergist on the melt fracture reduction obtained with a hyperbranched polyester polyol polymer processing additive.
Figure 4:
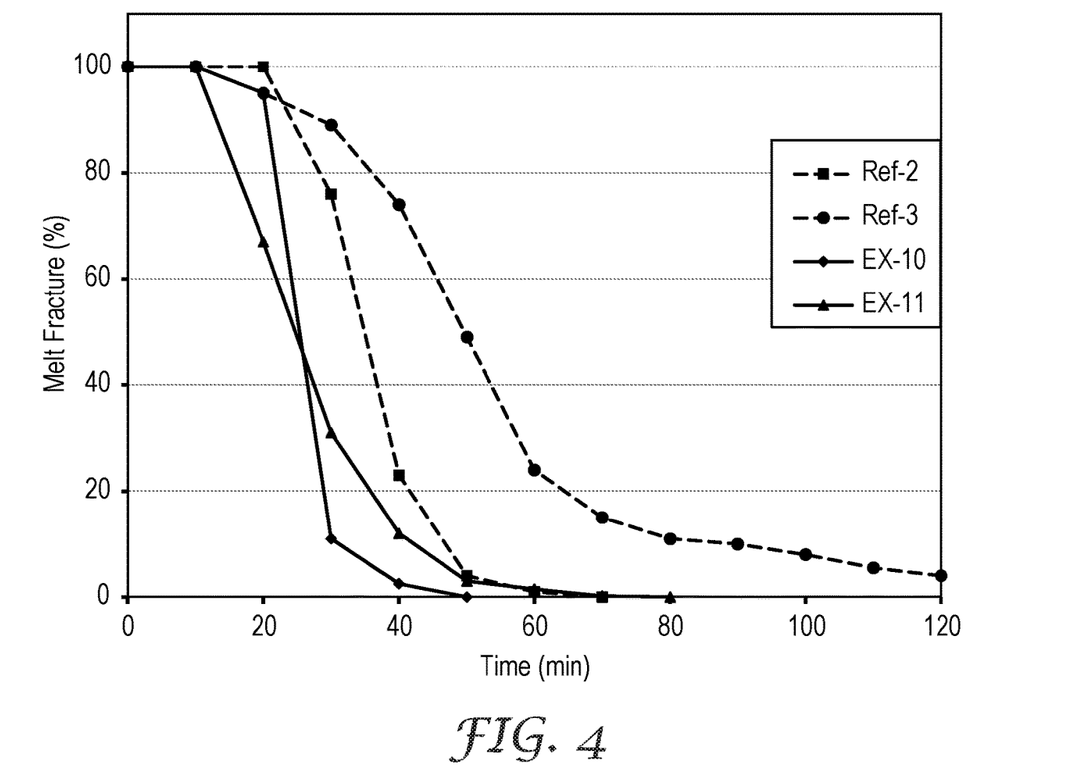
FIG. 4 shows the effects of adding various poly(ethylene oxide) synergists on the melt fracture reduction obtained with a hyperbranched polyester polyol polymer processing additive.
Figure 5:
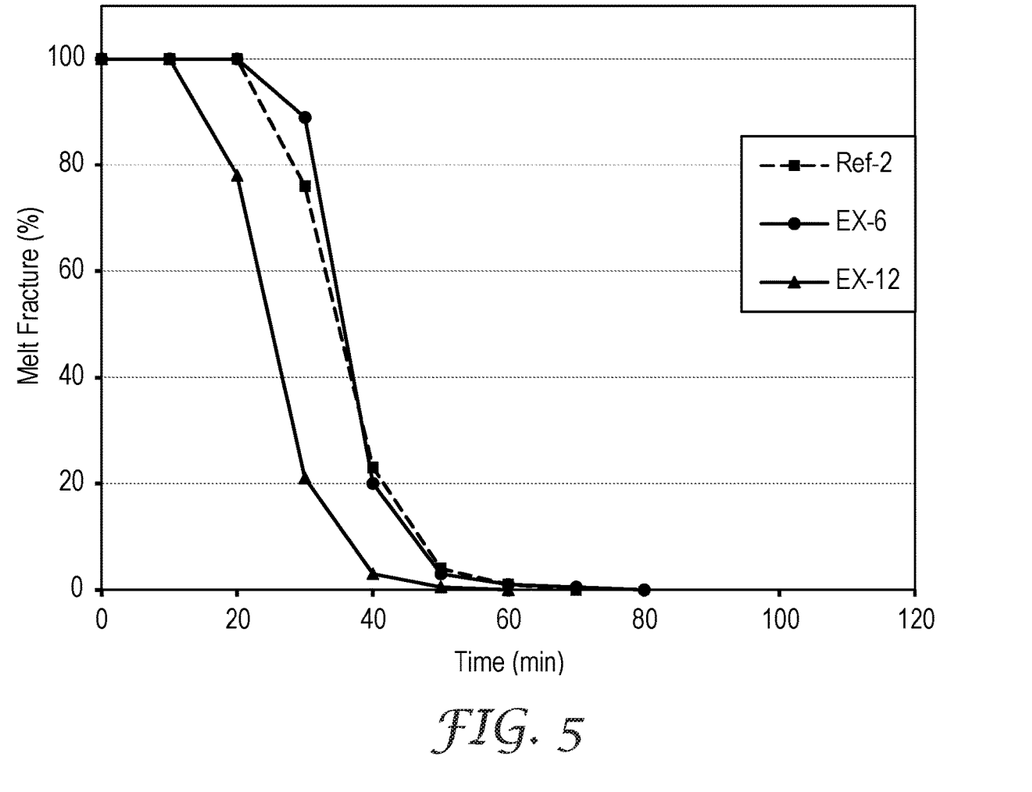
FIG. 5 shows the effects of adding a hyperbranched polyester polyol polymer processing additive and a synergist as a combined master batch processing additive on the melt fracture reduction.

Reference Example 3 (REF-3) was prepared with 500 ppm of the hyperbranched polyester polyol PPA based on the total weight if the extruded composition. Examples EX-9, EX-10 and EX-11 were prepared with 500 ppm of the hyperbranched polyester polyol PPA in combination with 500 ppm of a either a polycaprolactone (PCL) or poly (ethylene oxide) (PO) synergist. As shown in Table 4, FIG. 3 (PCL) and FIG. 4 (PEO), in each case, the addition of the synergist improved the melt fracture reduction, with results comparable to the use of 1000 ppm of the hyperbranched polyester polyol PPA (REF-2).

TABLE 4

Melt fracture improvement with various synergists.

| ID | PPA (ppm) | Synergist | Synergist (ppm) | TTC (minutes) | MF@120 minutes | Pressure Reduction |
|---|---|---|---|---|---|---|
| Ref-2 | 1000 | None | 0 | 70 | 0% | 7.5% |
| Ref-3 | 500 | None | 0 | 120 | 4% | 4.8% |
| EX-9 | 500 | PCL 80K | 500 | 70 | 0% | 4.2% |

TABLE 4-continued

Melt fracture improvement with various synergists.

| ID | PPA (ppm) | Synergist | Synergist (ppm) | TTC (minutes) | MF@120 minutes | Pressure Reduction |
|---|---|---|---|---|---|---|
| EX-10 | 500 | PEO 20K | 500 | 50 | 0% | 7.0% |
| EX-11 | 500 | PEO 300K | 500 | 80 | 0% | 6.9% |

In the previous examples, the hyperbranched polyester polyol PPA and the synergist were added as separate master batches to form the extrudable composition. In the following example, a combined master batch was prepared. This combined master batch (CMB) was prepared in the same manner as the other master batches, except the CMB was prepared from 30 g of the hyperbranched polyester polyol PPA and 30 g of the PEG 8K synergist, resulting in 2.0 wt. % of the combined PPA and synergist based on the total weight of the CMB.

This CMB was used to form the extrudable composition of Example EX-12, containing 500 ppm of the hyperbranched polyester polyol PPA and 500 ppm of the PEG 8K synergist, each by weight based on the total weight of the extrudable composition. Testing was preformed using the blown film line. The results are shown in Table 5 and FIG. 4, with a comparison to EX-6, which was prepared using separate master batches of the hyperbranched polyester polyol PPA and the PEG 8K synergist.

TABLE 4

Results using a combined master batch of the hyperbranched polyol PPA and synergist.

| ID | Master batch | PPA (ppm) | Synergist | Synergist (ppm) | TTC (minutes) | MF@120 minutes | Pressure Reduction |
|---|---|---|---|---|---|---|---|
| Ref-2 |  | 1000 | PEG 8K | 0 | 70 | 0% | 7.5% |
| EX-6 | separate | 500 | PEG 8K | 500 | 80 | 0% | 7.0% |
| EX-12 | combined | 500 | PEG 8K | 500 | 60 | 0% | 11.4% |

What is claimed is:

1. A composition consisting essentially of (a) greater than 50% by weight of a thermoplastic polymer and (b) a polymer processing additive composition consisting essentially of
    (i) a hyperbranched polyester polyol, wherein the hyperbranched polyester polyol is a hydroxy-functional, hyperbranched polyester having functional end groups, in which at least 90 mole % of the functional end groups are hydroxy groups; and
    (ii) a synergist selected from the group consisting of polyethylene glycols, poly(ethylene oxide)s, polycaprolactones and combinations thereof;
    wherein the composition does not contain a fluoropolymer.

2. The composition of claim 1, wherein the composition comprises 100 to 3000 ppm by weight of the polymer processing additive composition based on the weight of the total composition.

3. The composition of claim 1, wherein the polymer processing additive composition comprises at least 100 ppm of the hyperbranched polyester polyol and at least 100 ppm of the synergist, based on the weight of the thermoplastic polymer.

4. The composition of claim 3, wherein the weight ratio of the hyperbranched polyester polyol to the synergist is from 10:90 to 90:10.

5. The composition of claim 4, wherein the weight ratio of the hyperbranched polyester polyol to the synergist is from 25:75 to 75:25.

6. The composition of claim 1, wherein the synergist comprises a polyethylene glycol.

7. The composition of claim 6, wherein the polyethylene glycol has a number average molecular weight of 1000 to 50,000 Daltons as measured by Gel Permeation Chromatography using polyethylene glycol and poly(ethylene oxide) standards.

8. The composition of claim 1, wherein the synergist comprises a poly(ethylene oxide).

9. The composition of claim 8, wherein the poly(ethylene oxide) has a number average molecular weight of 10,000 to 500,000 Daltons as measured by Gel Permeation Chromatography using polyethylene glycol and poly(ethylene oxide) standards.

10. The composition of claim 1, wherein the synergist comprises a polycaprolactone.

11. The composition of claim 10, wherein the polycaprolactone has a number average molecular weight of 2,000 to 200,000 Daltons as measured by Gel Permeation Chromatography using polyethylene glycol and poly(ethylene oxide) standards.

12. The composition of claim 1, wherein the hyperbranched polyester polyol comprises 2,2-bis(methylol)propionic acid branching units.

13. The composition of claim 12, wherein the hyperbranched polyester polyol is a pseudo generation 2 hyperbranched polyester polyol with 16 hydroxyl functional groups.

14. The composition of claim 1, wherein the thermoplastic polymer comprises a polyolefin.

15. The composition of claim 14, wherein the polyolefin comprises a linear low density polyethylene.

16. The composition of claim 1, wherein the composition comprises 100 to 3000 ppm by weight of the polymer processing additive composition based on the total weight of the composition.

17. A method for forming a film comprising:
    A) blending (a) a thermoplastic polymer with (b) a polymer processing additive composition to form a composition, wherein the polymer processing additive composition consists essentially of a hyperbranched polyester polyol and a synergist selected from the group consisting of polyethylene glycols, polyethylene oxides, polycaprolactones and combinations thereof, and B) extruding the composition;

wherein the hyperbranched polyester polyol is a hydroxy-functional, hyperbranched polyester having functional end groups, in which at least 90 mole % of the functional end groups are hydroxy groups;

wherein the composition does not contain a fluoropolymer.

18. The method of claim 17, wherein blending the thermoplastic polymer with the hyperbranched polyester polyol and the synergist to form the composition comprises blending the hyperbranched polyester polyol and the synergist to form a polymer processing additive composition and blending the polymer processing additive composition with the thermoplastic polymer.

19. The method of claim 17, wherein the composition comprises 100 to 3000 ppm of the polymer processing additive composition based on the total weight of the composition.

\* \* \* \* \*